(12) United States Patent
Arethens

(10) Patent No.: US 6,195,040 B1
(45) Date of Patent: Feb. 27, 2001

(54) SATELLITE SIGNAL RECEIVER WITH POSITION EXTRAPOLATION FILTER

(75) Inventor: Jean-Pierre Arethens, Beaumont les Valence (FR)

(73) Assignee: Sextant Avionique, Velizy Villacoublay (FR)

(*) Notice: Subject to any disclaimer, the term of this patent is extended or adjusted under 35 U.S.C. 154(b) by 0 days.

(21) Appl. No.: 09/147,356

(22) PCT Filed: Jun. 3, 1997

(86) PCT No.: PCT/FR97/00965

§ 371 Date: Dec. 7, 1998

§ 102(e) Date: Dec. 7, 1998

(87) PCT Pub. No.: WO97/47986

PCT Pub. Date: Dec. 18, 1997

(30) Foreign Application Priority Data

Jun. 7, 1996 (FR) .................................................. 96 07071

(51) Int. Cl.[7] .................................................. H04B 7/185
(52) U.S. Cl. .............................. 342/357.12; 342/357.02; 342/357.05
(58) Field of Search ........................ 342/357.05, 357.02, 342/357.12

(56) References Cited

U.S. PATENT DOCUMENTS 5,132,695 * 7/1992 Dumas et al. ...................... 342/461
5,452,211 * 9/1995 Kyrtsos et al. .................. 342/357.01
5,459,473 * 10/1995 Dempster et al. ............... 342/357.12
5,590,043 * 12/1996 McBurney ....................... 342/357.02

FOREIGN PATENT DOCUMENTS

WO 95/00861 * 1/1995 (WO) ............................... G01S/5/02

OTHER PUBLICATIONS

Richard L. Burden and J. Douglas Faires, Numerical Analysis, 5th edition, PWS Publishing, Boston, section 4.3, 1993.*

International Search Report for PCT/FR97/00965, Jun. 1997.*

* cited by examiner

Primary Examiner—Thomas H. Tarcza
Assistant Examiner—Fred H Mull
(74) Attorney, Agent, or Firm—Oblon, Spivak, McClelland, Maier & Neustadt, P.C.

(57) ABSTRACT

A GPS satellite signal receiver fitted on an aircraft. Velocity measurements are used to obtain position values at a sufficient rate to provide position extrapolation while waiting for the next position measurement. A corrected position is provided on the basis of a measured position by adding to the preceding corrected position, the velocity integrated between two times and a smoothing term which is a fraction of the difference between the measured position and the corrected position at the preceding position measurement time.

13 Claims, 2 Drawing Sheets

SATELLITE SIGNAL RECEIVER WITH POSITION EXTRAPOLATION FILTER

BACKGROUND OF THE INVENTION

1. Field of the Invention

The invention relates to satellite positioning receivers such as GPS (Global Positioning System) receivers.

2. Discussion of the Background

The GPS system uses a constellation of satellites which move around the earth on very precisely determined orbits, that is to say it is possible to know the position of an arbitrary satellite at any time. The satellites transmit radiofrequency signals, containing navigation data and codes which make it possible to identify each satellite. These codes phase modulate a carrier frequency. A GPS receiver, on the ground or on a land, air or sea vehicle, can receive the signals from several satellites simultaneously, precisely calculate its distance from each of the satellites, and deduce therefrom its precise position in latitude, longitude and altitude in a terrestrial frame. It can also deduce therefrom the precise date and time of the reception in the time frame of the GPS system. It can lastly deduce therefrom, by Doppler measurements, its own velocity vector in the terrestrial frame (the case of a receiver mounted on a moving vehicle).

In the GPS system, each satellite is identified by a pseudo-random code which is individual to it and repetitively (for example every millisecond) modulates a carrier frequency which the satellite transmits. There are systems similar to GPS, in particular the GLONASS system, in which this pseudo-random code also exists even though it is not used to identify individual satellites. The invention which will be described is directly applicable to the GLONASS system, but for the sake of simplicity reference will be made below only to the GPS system, and more precisely the "civil" part of the GPS system which also has a military part to which the invention is equally applicable.

The pseudo-random code is a long code (1023 bits at 1.023 MHz, i.e. 1 millisecond), and one of its main functions is to make it possible to extract the satellite's signal from a noise level much higher (for example 30 dB) than the level of the signal. This technique is now widely known as spread spectrum transmission. The signal is extracted from the noise using an operation, in the receiver, of correlation between the received signal and a periodic pseudo-random code which is identical to the one expected to be found in the signal. If the codes do not coincide temporally, there is no correlation between the received signals and the local code generated by a local code generator; if they almost coincide, there is some degree of correlation, the correlation energy becoming stronger as the coincidence becomes more exact. It is therefore possible to establish a correlation signal making it possible to slave the local code generator until exact coincidence is obtained between the local code and the code modulating the signal which the satellite transmits. A code slaving loop then makes it possible to maintain this coincidence.

The pseudo-random code is transmitted by the satellite at extremely precise times which are known at the receiver. Use is made of the correlation operation to determine the arrival time of this code in the receiver: the characteristic time or epoch of transmission of the local code is determined, and since this local code coincides with the received code when the maximum correlation is established, this time represents the arrival time of the received code. The difference between a time at which the code is transmitted via the satellite and a time at which the code is received by the receiver makes it possible to determine a propagation time of the signals between the satellite and the receiver. Knowing that the propagation velocity of the signals is the velocity of light, the distance between the receiver and a given satellite can be calculated. The same operation performed on two other satellites makes it possible, by triangulation, to determine the exact position of the receiver relative to the three satellites.

By using a fourth satellite, the clock errors of the receiver are eliminated, the clock of the receiver not being as precise as that of the satellites. Further to the position of the receiver, it is then possible to calculate a precise time for the position measurement, in the time frame of the GPS satellites.

The position of each of the satellites is known at any time: it is calculated on the basis of tables which are stored in the receiver and are updated by the navigation message broadcast by the satellites. The velocity of the satellites at any time can also be calculated on the basis of these tables.

It is possible to determine, on the basis of the signals sent by four satellites, the time and the position of the receiver relative to the four satellites. Furthermore, by changing co-ordinates, the position of the receiver in a fixed terrestrial frame is obtained.

Similarly, the velocity of the receiver is calculated on the basis of a Doppler-effect measurement on the carrier frequency of the radiofrequency signal sent by the satellites. It is therefore possible to calculate the relative velocity of the receiver with respect to each of the satellites, along the director axis which joins this satellite to the receiver. Four satellites are needed to eliminate the time ambiguity. Four different relative velocity vectors are obtained, along the director axes joining the receiver to the four satellites. Simple calculations make it possible to determine the velocity of the receiver along three axes in the terrestrial frame on the basis of these four velocity vectors and the following information:

- the directions of the receiver-satellite director axes with respect to a fixed terrestrial frame (longitude, latitude, altitude); these directions are themselves obtained by knowledge of the position of the receiver at a given time and the position of each satellite at the same time;
- the individual velocities of the satellites in the terrestrial frame at this time.

In view of the necessary compromise between the dynamic response and the noise performance of the code slaving loops, it is difficult to obtain more than one position measurement per second (a measurement deduced from the code-based measurements). In certain applications of GPS receivers, this rate may be insufficient. This might be the case, for example, if a GPS receiver were to be used by an aircraft in automatic pilot mode in a landing approach phase; this is why the use of GPS receivers is not currently envisaged in this case. This is, however, regrettable because a GPS receiver would otherwise have all the qualities required for it to be used in this type of application.

SUMMARY OF THE INVENTION

In order to make it possible to use a GPS receiver on a mobile in applications where the rate at which the position is supplied has to be greater than that which the receiver normally supplies, it is proposed according to the invention to combine a position measurement based on a pseudo-distance measurement at a given time and a velocity measurement provided by the receiver on the basis of Doppler measurements in the pseudo-distance measurement circuits (as opposed to velocity measurements which could be obtained by differentiating position measurements, or velocity measurements obtained by instruments other than the GPS receiver), in order to extrapolate the position of the receiver at times intermediate between two position measurements and to provide corrected intermediate positions between two measurements taken on the basis of the pseudo-distances.

Furthermore, since the receiver is most often capable of providing a velocity measurement at a rate higher than the rate at which the position is provided, the extrapolation can be further refined by using a new velocity measurement at each intermediate time. For example, a GPS receiver which provides one position per second can provide a velocity every 0.2 seconds.

This solution is particularly advantageous for obtaining very precise positions in a differential GPS receiver application, that is to say in an application in which the receiver receives not only the signals from several satellites, but also the signals from a fixed terrestrial beacon, of known position, in proximity to the site where the receiver is.

If the rules for calculating extrapolated position are suitably chosen, it is also possible to avoid the influence of sudden jumps in position when the satellite constellation is changed: the measurement errors affecting the various satellites are not the same from one group of satellites to another, and a measurement taken with a first group of satellites will not give exactly the same position as a measurement taken at the same site with a different group. Since the receiver and the satellites move, the receiver successively sees different constellations and, when one satellite leaves the field of observation of the receiver and is replaced by another, the new position may jump suddenly by a small value. This situation is frequently encountered in an aircraft because the roll of the aircraft when its course changes modifies the constellations seen by the GPS receiver. Calculations of position corrected on the basis of previously calculated positions make it possible to smooth the transition between two different measurements, whether or not by using the velocity information, use of the velocity being of course preferable.

This advantage of position smoothing when faced with constellation changes is obtained, in particular, by means of calculation means which provide a corrected position at a given time, this corrected position taking into account the position measured at this time and a corrected position calculated at a preceding time. The difference between these two positions is preferably calculated, it is multiplied by a coefficient less than 1 and it is added to the previously corrected position. If the velocity is utilized, the procedure is preferably as follows: in order to obtain a corrected position at a time following the provision of a position measurement by the receiver (and before another measurement), the following two terms are added to the corrected position calculated at the preceding time:

product of the current velocity (in practice the velocity at the current time or at the preceding time) multiplied by the time interval dT separating the two successive times at which the corrected position is calculated, and product of the difference between the measured position and the corrected position calculated at the preceding time, multiplied by a coefficient less than 1.

This is equivalent to saying that the velocity is integrated between two measurements in order to correct the position, and a smoothing term is added.

BRIEF DESCRIPTION OF THE DRAWINGS

Other characteristics and advantages of the invention will become apparent on reading the following detailed description which is given with reference to the appended drawings, in which.

DETAILED DESCRIPTION OF THE PREFERRED EMBODIMENTS

Figure 1:
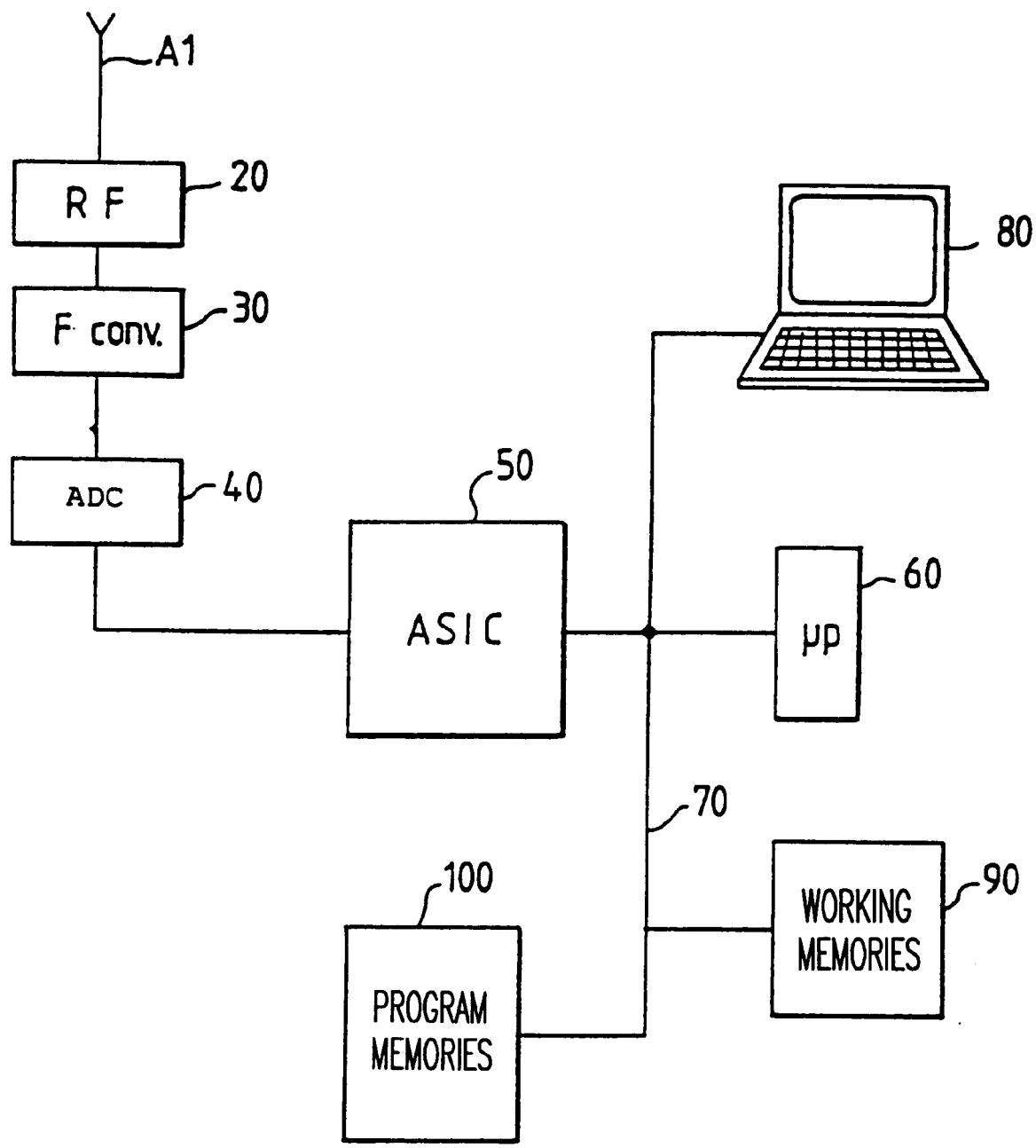
FIG. 1 represents the overall structure of a GPS receiver in which the present invention may be implemented.

FIG. 1 gives a brief overview of the general principle of a GPS receiver. The receiver has a radiofrequency part, comprising an antenna A1, a radiofrequency amplifier 20 and various associated filtering circuits, frequency conversion circuits 30 and an analog to digital converter 40. The converter makes it possible to deliver relatively low-frequency digital signals intended to be processed in a digital signal processing circuit 50. This circuit is controlled by a microprocessor 60 and associated calculation and control software.

The microprocessor 60 has two functions:

on the one hand, it works out digital data used by the digital signal processing circuit 50, on the basis of digital data delivered by this circuit; in particular, it performs numerical calculations necessary for the digital slaving loops present in the digital processing circuit 50;

and on the other hand it gives final results of position, time and velocity calculation to the user, that is to say either on a digital display screen or on a digital bus to other equipment which need the results.

It could clearly be possible to have two separate processors for performing these two functions. In the embodiment with a single microprocessor 60, a bus 70 has been represented for exchanges between the microprocessor 60, the processing circuit 50, an input/output peripheral 80, the working memories 90, and the program memories 100 which contain the programs needed for the microprocessor to function.

Very briefly, the digital signal processing circuit has either a single processing channel, with the information from the various satellites being multiplex-processed, or preferably several channels which each work in parallel on a determined satellite.

Each channel has a double slaving loop: carrier phase slaving and code phase slaving.

The carrier phase loop essentially uses a local oscillator with digital phase control, delivering a periodic (sawtooth) digital phase at a frequency corresponding to the transposed carrier frequency, taking into account the Doppler effect to which the carrier frequency broadcasted by a satellite is subjected. The Doppler effect is taken into account by the very fact of the existence of the slaving loops. The microprocessor 60 calculates a carrier phase error signal; this signal is used to control the local oscillator in order to slave a local carrier frequency to the carrier frequency received from the satellite.

The code phase slaving loop has a local code generator driven by an oscillator with digital phase control. It makes it possible to slave the local codes to the code received from the satellite and then to be able to determine the exact temporal position of the local codes thus slaved. The local code is correlated with the code received from the satellite; the correlation signal is calculated by the microprocessor and is used to slave the loop in order to bring the local code into synchrony with the code received from the satellite.

The two slaving loops, for code and carrier, take into account the Doppler frequency shift on the carrier frequency and on the code, which result from the relative motion of the aircraft and the detected satellite. This Doppler shift can be measured in the loops.

The GPS time and position calculations are performed on the basis of the status of the slaving loops at a determined measurement time. At this time, the exact status of the phase of the two oscillators with digital phase control are read.

The slaving loops provided in the receiver act to lock a local frequency onto the carrier frequency received from the satellites. The shift between this local frequency and the stable and known frequency transmitted by the satellites gives an indication of Doppler shift and therefore the difference between the velocity of the satellite and the velocity of the receiver along the axis joining the satellite to the receiver.

Consequently, on the basis of measurements taken on the pseudo-random code, a so-called "resolved position" is calculated in the terrestrial frame; and, on the basis of measurements taken on the carrier frequencies, and therefore by Doppler-effect measurements, a velocity of the receiver in the terrestrial frame is calculated.

According to a first aspect of the invention, the velocity measurement is used to provide an extrapolated position during the time interval separating the provision of a first position from the provision of a new position. The velocity measurement is that resulting from the Doppler measurements in the pseudo-distance measurement circuits, which make it possible to calculate the position of the receiver on the basis of the positions of the satellites.

Let $p_i$ be the resolved position at a time $T_i$, Band $V_i$ the resolved velocity at this time $T_i$. $P_i$ and $V_i$ are vectors in the terrestrial frame. Let kdT be the time interval after which a new position measurement is obtained: a new position is calculated by the receiver at a time $T_{i+1}=T_i+kdT$. Let j be an index (j=1 to k) representing intermediate times $T_{i,j}$ at which it is desired to obtain extrapolated positions $P_{i,j}$ on the basis of the position $P_i$ until the provision of the position $P_{i+1}$. These times are separated by the duration dT. For j=k, the time $T_{i,k}$ corresponds to the time $T_{i+1}$, that is to say the measurement of the next position sample.

An intermediate position is worked out at a given time by adding to the position determined at the preceding time the product of the velocity multiplied by the time interval separating the two times in question:

$$P_{i,1}=P_i+V_i \cdot dT, \text{ then } P_{i,2}=P_{i,1}+V_i \cdot dT, P_{i,j+1}=P_{i,j}+V_i \cdot dT, \text{ etc·, and finally } P_{i,k-1}=P_{i,k-2}+V_i \cdot dT$$

If the velocity $V_i$ is provided at a faster rate than the position, the last known value of velocity is preferably used at each increment. In particular, if dT represents the time interval separating two velocity calculations by the receiver and if $V_{i,j}$ then represents the velocity at time $T_i+j \cdot dT$, then the corrected position at time $T_i+(j+1) \cdot dT$ is written:

$$P_{i,j+1}=P_{i,j}+V_{i,j} \cdot dT$$

Independently of the extrapolation using the velocity, provision may also be made to calculate a smoothed corrected position on the basis of the positions previously calculated. This makes it possible, in particular, to avoid jumps in position when the constellation changes. In this case, the filtered position at a time $T_{i,j+1}$ can be calculated on the basis of the filtered position at time $T_{i,j}$ and of the position calculated at time $T_i$, by the formula:

$$P_{i,j+1}=P_{i,j}+\alpha \cdot (P_i-P_{i-1,k})$$

where $\alpha$ is a smoothing coefficient less than 1/k, k being the number of intermediate samples between two position measurements $P_i$ and $P_{i+1}$.

$P_{i-1,k}$ is the filtered position at the moment of the position measurement $P_i$ (time $T_i$). It therefore corresponds to the calculation of filtered position at the time $T_i$ when a new position sample $P_i$ is provided, this calculation resulting from the preceding measurements of position and velocity.

This means that convergent iteration is used to correct the position which is calculated with a fraction of the difference between the resolved position and a previously corrected position.

If the velocity extrapolation and the smoothing filtering are combined, the corrected position $P_{i,j+1}$ at the intermediate time $T_{i,j+}$can be calculated by the formula:

$$P_{i,j+1}=P_{i,j}+V_{i,j} \cdot dT+\alpha \cdot (P_i-P_{i-1,k})$$

Therefore, at each extrapolation time, a corrected position $P_{i,j+1}$ is provided which takes account of the filtered position $P_{i-1,k}$ calculated at the preceding position measurement time, of the velocity $V_{i,j}$ known at the preceding extrapolation time (or the last known velocity), and finally the last position $P_i$ provided by the measurements of the receiver.

More precisely, the corrected position at time j+1 is deduced from the corrected position at the preceding time j with a first term which is the integral of the velocity over the interval which separates these two times, and with a second term which is a fraction of the difference between the measured position at time $T_i$ and the corrected position at time $T_{i-1}$.

So long as the position $P_i$ and the velocity $V_{i,j}$ are available, the invention can be implemented to calculate a corrected position at each time.

One embodiment of the invention consists in integrating the velocity $V_{i,j}$ at each time to work out an extrapolation term representing $V_{i,j} \cdot dT$. The smoothing term $\alpha \cdot (P_i-P_{i-1,k})$ can be obtained by working out the difference $(P_i-P_{i-1,k})$ and multiplying it by an attenuation coefficient $\alpha$.

However, it is also possible, in an embodiment with numerical calculation, to integrate a term $\beta(P_i-P_{i-1,k}) \cdot dT$, that is to say to calculate $\beta(P_i-P_{i-1,k}) \cdot dT$, in which $\beta$ is a smoothing coefficient, homogeneous with a frequency and such that $\beta \cdot dT<1$.

Figure 2:
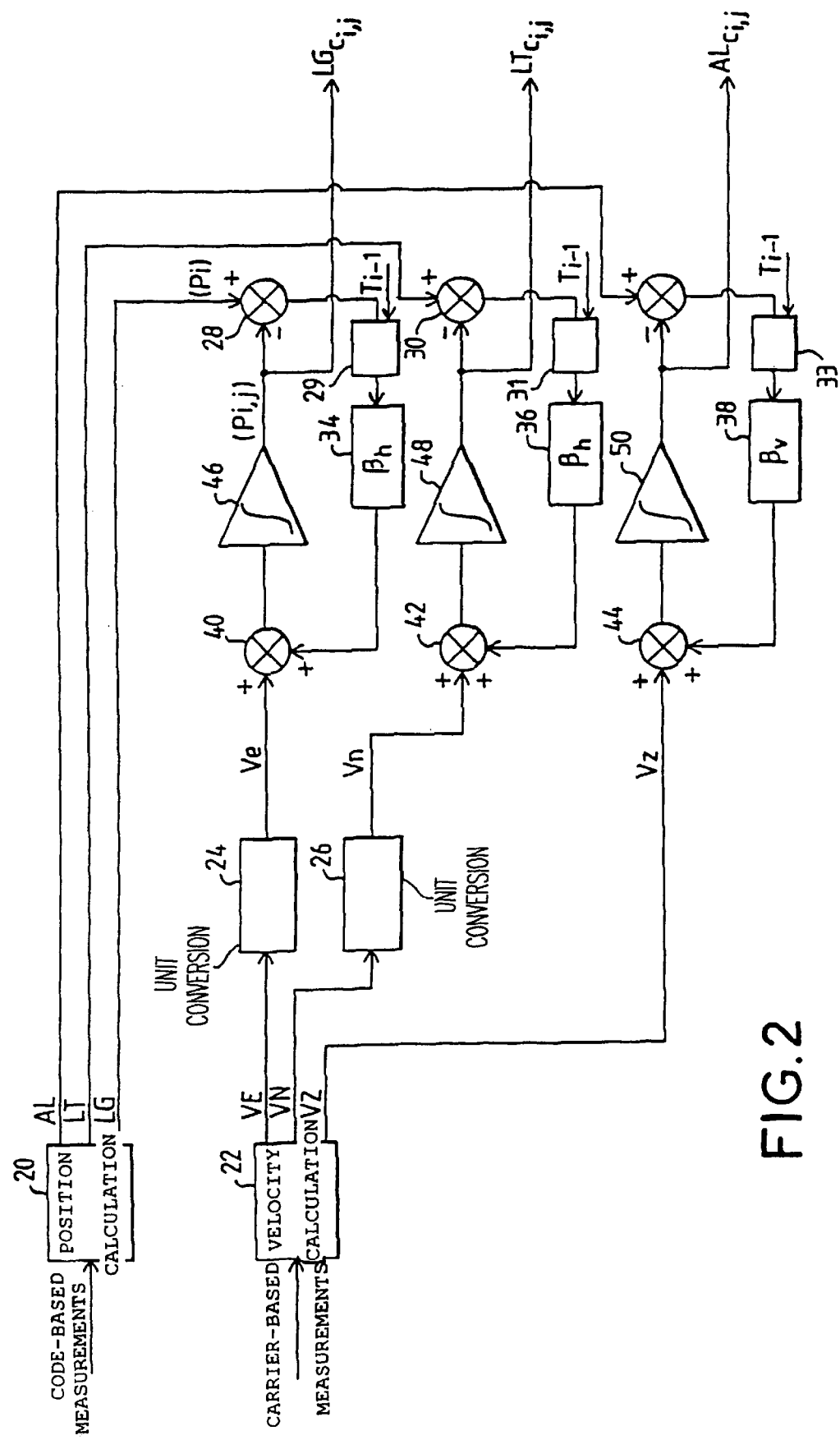
FIG. 2 represents a device for implementing the invention.

The device represented in FIG. 2 makes it possible to implement the invention in this latter form. It may be produced in hardware form or in software form. The microprocessor 60 in FIG. 1 makes it possible to perform the calculations. The block 20 represents a function of calculating position on the basis of the physical measurements provided by the receiver based on the random code positions in the satellite signals. The block 22 represents a function of calculating velocity on the basis of the measurements of carrier frequency of the satellite signals. The position calculated by the block 20 is expressed in principle at longitude LG, latitude LT and altitude AL. The velocity calculated by the block 22 is expressed in east-west velocity VE, in north-south velocity VN and in vertical velocity VZ.

If the velocities VN and VE are not expressed using the same distance units as the latitudes and longitudes, unit conversions are performed by the blocks 24 and 26 (example: longitudes and latitudes expressed in degrees/minutes and velocities in metres/seconds).

The corrected position is provided in longitude, latitude and altitude on the outputs LGc, LTc and ALc. Subtractors 28, 30, 32 establish the difference between the measured position LG, LT, AL and the corrected position LGc, LTc, ALc at the moment of the measurement (time $T_i$). These differences are stored in memory in the blocks 29, 31, 33 which keep these differences until the next position measurement time $T_{i+1}$. Multipliers 34, 36, 38 multiply these differences by the same smoothing coefficient β or by different coefficients, for example one coefficient $β_h$ for the horizontally measured positions (longitude and latitude) and $β_v$ for the vertically measured positions. Adders 40, 42, 44 add the outputs of the multipliers, respectively, to the velocities Ve, Vn and VZ. Finally, integrators 46, 48, 50 integrate the outputs of the adders 40, 42, 44, the outputs of these integrators providing the corrected positions LGc, LTc, ALc. In a purely numerical form of processing, the integrators make do with multiplying the outputs of the adders 40, 42, 44 by the time interval dT between two successive calculations of corrected position.

This device therefore makes it possible to provide the positions corrected according to the principles explained above. The repetition frequency may be 5 hertz, even though the uncorrected position measurements are provided at about 1 hertz.

The detailed mathematical formulae are as follows, in which the components of the position and velocity vectors and the smoothing coefficient β have been given in detail. This coefficient may be different for the longitude and latitude ($β_h$) and for the altitude ($β_v$).

$$\begin{bmatrix} LTc \\ LGc \\ ALc \end{bmatrix}_{i,j+1} = \begin{bmatrix} LTc \\ LGc \\ ALc \end{bmatrix}_{i,j} + \begin{bmatrix} Vn \cdot dT \\ ve \cdot dT \\ VZ \cdot dT \end{bmatrix}_{i,j} + \begin{bmatrix} β_h & 0 & 0 \\ 0 & β_0 & 0 \\ 0 & 0 & β_v \end{bmatrix} \begin{bmatrix} LT_i - LTc_{i-1,k} \\ LG_i - LGc_{i-1,k} \\ ALA_i - alc_{i-1,k} \end{bmatrix}$$

In one example, $B_v dT = β_h dT 0.2$.

What is claimed is:

1. A satellite positioning receiver, comprising:

position determining means for determining a measured position of the satellite positioning receiver based upon pseudo-random code measurements of received satellite signals, wherein each measured position is determined by the determining means at each of a series of measurement times that are separated from each other by a predetermined interval of time;

velocity determining means for determining measured velocity of the satellite positioning receiver by Doppler-effect measurement based upon satellite carrier signals detected by the satellite positioning receiver; and means for extrapolating corrected intermediate positions of the satellite positioning receiver between two measured positions based on the first occurring measured position of the two measured positions and the measured velocity.

2. The satellite positioning receiver according to claim 1, wherein the means for extrapolating includes means for providing, at a current time, a corrected position which takes into account the position determined at the current time and a preceding corrected position previously determined.

3. The satellite positioning receiver according to claim 2, wherein the means for providing a corrected position includes means for adding to the preceding corrected position the difference between the position determined at the current time and the preceding corrected position, said difference being multiplied by a smoothing coefficient less than 1.

4. The satellite positioning receiver according to claim 3, wherein the velocity measurement used to extrapolate the corrected position at a given time is the last velocity measurement provided by the satellite positioning receiver before the given time.

5. The satellite positioning receiver according to claim 2, wherein the velocity measurement used to extrapolate the corrected position at a given time is the last velocity measurement provided by the satellite positioning receiver before the given time.

6. The satellite positioning receiver according to claim 1, wherein the velocity measurement used extrapolate a corrected position at a given time is the last velocity measurement provided by the satellite positioning receiver before the given time.

7. The satellite positioning receiver according to claim 6, wherein the means for extrapolating the corrected position at a given time includes means for integrating the velocity at a preceding time over a period of time corresponding to the difference between the given time and the preceding time.

8. The satellite positioning receiver according to claim 7, wherein the means for extrapolating the corrected position at a given time includes means for adding the following two terms to the corrected position determined at the preceding time:

product of the current velocity multiplied by the time interval separating the given time and the preceding time, product of the difference between the current measured position and the corrected position at the preceding time and a coefficient less than 1.

9. The satellite positioning receiver according to claim 7, further comprising means for integrating the measured velocity, and means for integrating the difference between the current measured position and the corrected position, the difference being assigned a smoothing coefficient β which is homogeneous with a frequency and such that βdT is less than unity, where dT is the time interval between two successive determinations of corrected position.

10. A satellite positioning receiver, comprising:

position determining means for determining a measured position of the satellite positioning receiver based upon pseudo random code measurements of received satellite signals, wherein each measured position Pi,o is determined by the determining means at each of a series of successive measurement times Ti that are separated from each other by a predetermined interval of time k·dT where k is an integer greater that 2, dT is an elementary time interval and i is an integer index;

velocity determining means of determining a measured velocity V of the satellite positioning receiver by Doppler-effect measurement based upon satellite carrier signals detected by the satellite positioning receiver; and means for extrapolating intermediate positions P1j+1 of the satellite positioning receiver at times Ti+j·dT between two successive times Ti and Ti+1, j being an integer index between 1 and k−1, said means for extrapolating comprising means for computing Pij+1 by adding a term V·dT to a previous determined position Pij.

11. A satellite positioning receiver according to claim 10, wherein said measured velocity V is a velocity Vi,j at time Ti+j·dT, j being an integer index between 1 and k−1.

12. A satellite positioning receiver according to one of claims 10 or 11, wherein said extrapolating means further comprise means for adding a term α(Pi,0−Pi−1,k), where Pi−1, k is a corrected position calculated by said extrapolating means for time T1−1+k·dT and α is a coefficient smaller than unity.

13. A satellite positioning receiver, comprising:

position determining means for determining a measured position of the satellite positioning receiver based upon pseudo random code measurements of received satellite signals, wherein each measured position $P_{i,0}$ is determined by the determining means at each of a series of successive measurement times $T_i$ that are separated from each other by a predetermined interval of time $k \cdot dT$ where k is an integer greater than 2, dT is an elementary time interval and i is an integer index;

velocity determining means for determining a measured velocity $V_{ij}$ of the satellite positioning receiver by Doppler-effect measurement at times $T_i + j \cdot dT$ based upon satellite carrier signals detected by the satellite positioning receiver, j being an index between 1 and k; and means for extrapolating corrected intermediate positions $P_{i,j+1}$ of the satellite positioning receiver at times $T_1 + j \cdot dT$ between two successive times $T_1$ and $T_1+1$, based on velocity $V_{i,j}$, said means for extrapolating comprising means for integrating a difference between current measured position $P_{i,0}$ and a corrected position $P_{i-1,k}$ computed by said extrapolating means at time $T_{i-1} + k \cdot dT$, said difference being assigned a smoothing coefficient $\beta$ which is homogeneous with a frequency and such that $\beta dT$ is less than unity.

* * * * *